Patented Feb. 7, 1933

1,897,019

UNITED STATES PATENT OFFICE

FRITZ EMIL FUCHS, OF MAPLEWOOD, NEW JERSEY, ASSIGNOR, BY MESNE ASSIGNMENTS, TO THE DEHYDRO COMPANY, OF TULSA, OKLAHOMA, A CORPORATION OF OKLAHOMA

TREATMENT OF CUT OILS

No Drawing.   Application filed April 22, 1931. Serial No. 532,117.

The subject of this invention is a material intended for the separation of water in oil or oil in water emulsions commonly termed cut oil, roily oil or BS&W, or in other words, basic sludge and water.

It is necessary and even essential that all foreign matter be removed from the oil before the oil is finished in any of the well known methods, regardless of the ultimate intent or purpose of the finished oil. One of the greatest difficulties is that of removing the water from the emulsion, not the great percentage of water that will in time settle, due to the difference in gravity between the materials, but that amount of water which is held in suspension by the minute globules of oil. A satisfactorily complete separation is accomplished only when the amount of water remaining in the oil is reduced to less than .5% and a more complete elimination of water is desirable if attainable, as it results in an oil product of greater value.

In my experimentations I have found that a practically complete separation of oil and water can be effected only by breaking the surface tension which exists in the oil-water globule and as previously stated, these so-called globules are exceedingly minute. It will be appreciated that a material to operate satisfactorily must not only rupture the film of the water globule but must also rupture the film of the oil globule.

I am fully aware that many combinations of material have been suggested for the purpose of breaking water and oil emulsions. I have discovered that in addition to the purpose above set forth, a suitable compound must have a very low freezing point or at least a very low congealing point and that the nature of the mixture and its speed and efficiency of operation must not be changed by the temperature under which it is required to serve.

The ability to withstand temperature changes is exceedingly important as these breaking compounds are used in the oil fields and are usually applied to the oil as it flows from the well, as the final product must be maintained at certain uniform standards. Materials or combinations of materials, the nature, or operation, or efficiency of which changes with temperature changes, are quite unsatisfactory.

Bearing in mind the requirements and conditions generally as set forth above, I have selected a combination of material that I have found will, when properly prepared, meet all requirements and overcome all known objections and this combination of materials consists of fatty oils and mineral oils, to which has been added pine oil prior to sulphonation.

As I have procured the best results with a combination of castor oil and pine oil, I will describe this combination and its operation.

The pine oil that I refer to is a product obtained from the destructive distillation of rosin as differentiated from turpentine or terpenes or even the turpentine-like oil obtained from pine seeds or needles.

It will, of course, be understood that because of the various combinations of water and oil, it will probably be found desirable, if not necessary, to modify any formula that I might suggest. I have, however, taken castor oil from 90 to 50% and pine oil from 10 to 50%, mixed these oils and sulphonated them in the usual manner, the differences in the percentages being due to the nature of the emulsion which might slow down penetration. From my experiments I believe that the pine oil is the penetrating agent and also the agent which controls fluidity, being less subject to temperature changes than is castor oil, a greater proportion of pine oil will be introduced if penetration is found to be slow or if temperature is exceedingly low.

The sulphonation of this mixture is accomplished in the usual manner. That is, the raw oils are mixed in the desired proportions, sulphuric acid is allowed to react on the mixture at as low a temperature as possible, every effort being made to incorporate the acid with the greatest speed, the excess acid is washed out of the mixture and/or the mixture neutralized by the addition thereto of an alkali. Inasmuch as sulpho compounds are very unstable, every effort must be made to prevent their decomposition. The temperature should not be allowed to exceed 25 to 30° centigrade and should be so maintained.

The average time of sulphonation called the "ageing time" is the period between the start of sulphonation and the washing process. Generally it is found that six to eight hours is sufficient time to get proper reaction between the oil and the sulphuric acid. Of course, it will be desirable to make a number of experiments to determine what treatment of the material will give the best results. For instance, it might be found that for certain work a low temperature and a longer period of ageing might be found desirable.

In mixing the acid with the oil every effort must be made to incorporate the quantity of acid as fast as possible without overstepping the limits of temperature. The washing process is as important as the sulphonation of the oil, as no matter how much care has been taken during the sulphonation it can be easily decomposed in washing, if proper care is not taken to prevent it.

The object of mixing pine oil and the fatty oil prior to sulphonation is also for the purpose of obtaining a higher $SO_3$ content based on the saponifiable fat, as I have found that it is possible to sulphonate a mixture of castor oil and pine oil to a very high degree and while I may, at all times, be satisfied with a 10% $SO_3$ content, based on the fatty matter, or even less, I see no reason why this could not be increased.

I am fully aware that many treating formulas have been suggested and that numerous patents have been issued thereon, but I believe that the material above described will overcome many of the difficulties found in the art and therefore what I claim and desire to secure by Letters Patent is:

1. A material for treating cut oil consisting of a sulphonated fatty oil, mineral oil and pine oil obtained as a rosin distillate mixed prior to sulphonation.

2. A material for separating water and oil emulsions consisting of castor oil and pine oil mixed and sulphonated after mixing.

3. A material for treating water and oil emulsions consisting of castor oil and pine oil mixed and sulphonated to the desired degree, the percentage of pine oil being determined by the desired degree of penetration and/or the temperature under which the mixture will be required to serve.

FRITZ EMIL FUCHS.